W. H. Green.
Inkstand.

No. 107,250.     Patented Sep. 13, 1870.

Witnesses:
A. Bonnewendorf
Alex T. Roberts

Inventor:
W. H. Green
per Munn & Co.
Attorneys.

United States Patent Office.

WILLIAM H. GREEN, OF NEW YORK, N. Y., ASSIGNOR TO HIMSELF AND FREDERICK McH. KITCHING, OF SAME PLACE.

Letters Patent No. 107,250, dated September 13, 1870.

IMPROVEMENT IN MARKING-POTS.

The Schedule referred to in these Letters Patent and making part of the same.

*To all whom it may concern:*

Be it known that I, WILLIAM H. GREEN, of the city, county, and State of New York, have invented a new and useful Improvement in Marking-Pot; and I do hereby declare that the following is a full, clear, and exact description thereof, which will enable others skilled in the art to make and use the same, reference being had to the accompanying drawing forming part of this specification.

This invention relates to a new and useful improvement in pots or vessels for containing paint or liquid for marking boxes, bales of goods, and for all of the purposes for which marking-pots are used; and It consists in a self-closing valve, arranged in connection with the handle in such a manner that when the pot is not in use it is closed by the valve, and when held by the handle it is open, as will be hereinafter more fully described.

In the accompanying drawing—

Similar letters of reference indicate corresponding parts.

A is the pot or vessel, of ordinary shape and size, but to the funnel-shaped top B there is attached a tube, C, the lower end of which forms a seat for the valve.

D is the valve.

E is a spring attached to the valve, and to the top of the pot, as seen at F.

G is the stem of the valve.

H is a rod attached to the stem, extending upward through the top of the pot.

Figure 1:
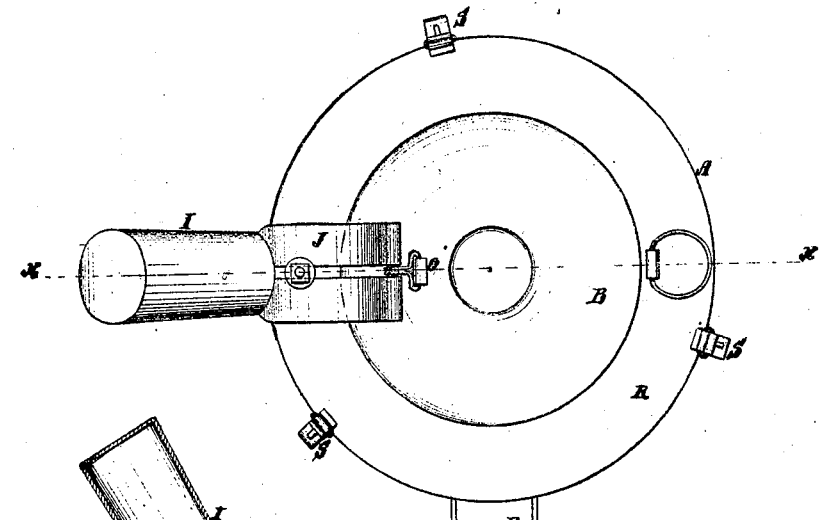
Figure 1 is a top view of the pot.
Figure 2:
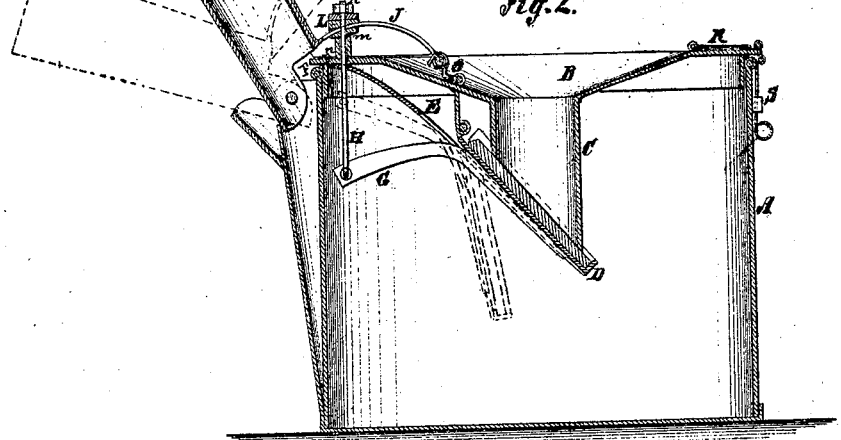
Figure 2 is a vertical section on the line $x\ x$ of fig. 1, showing, also, the position of the handle and valve when the latter is open and the pot in use, in dotted lines.

I is the handle of the pot, which is pivoted to projecting ears at its lower end, so that it may assume the position seen in dotted lines in fig. 2.

J is a slotted cam attached to the handle, projecting over the pot, as seen in the drawing. The rod H passes up through the slot in this cam, and is raised and lowered thereby, as the handle is raised and lowered.

The rod H has a vertical motion, or a motion parallel with the side of the pot, and is connected with the cam by a nut, K, and washers, L, above the cam, and washer $m$ on the short guide-tube $n$, through which tube the rod passes. As the handle is raised and lowered, the cam is drawn back and forth between the washers.

When there is paint or marking-fluid in the pot, to give the pot weight, the handle will occupy the position seen in dotted lines in fig. 2, when the pot is lifted, which will throw the cam and the rod into the position seen in dotted lines, and open the valve or throw the valve back from its seat, as seen also in dotted lines, thus giving ready access to the contents of the pot with the marking-brush.

When the pot is placed upon the floor, or in any situation where it is not supported by the handle, (as it would be when not in use,) the reaction of the spring E will close the valve, which action of the spring will draw down the rod and cam, and elevate the handle, as seen in fig. 2. A weight, instead of a spring, may be used to produce this effect, if desired.

O is a clasp, attached to the funnel B, for holding down the cam and keeping the valve closed when the pot is to be carried from place to place.

P is a recess on the side of the pot for holding the marking-brush. The top or cover R is removably attached to the pot by the clasps S.

By this arrangement the marking-pot is made perfectly secure. When not in immediate use, it is always tightly closed. No evaporation can take place, as no portion of the liquid is exposed to the atmosphere. If the pot is upset, the contents cannot escape.

The advantages of this mode of constructing marking-pots must be obvious to all.

Having thus described my invention,

I claim as new and desire to secure by Letters Patent—

The combination of the valve D and the handle I, with a marking-pot, when the same are connected together and arranged to operate substantially as and for the purposes set forth.

WM. H. GREEN.

Witnesses:
GEO. W. MABEE,
T. B. MOSHER.